United States Patent

[11] 3,614,372

[72] Inventor David H. Dulebohn
Minneapolis, Minn.
[21] Appl. No. 882,213
[22] Filed Dec. 4, 1969
[45] Patented Oct. 19, 1971
[73] Assignee Andrew Engineering Company
Hopkins, Minn.
Continuation-in-part of application Ser. No. 784,453, Dec. 17, 1968, now abandoned.

[54] TRACER CONTROLLED MACHINING BY ELECTRICALLY INDUCED EROSION
13 Claims, 15 Drawing Figs.

[52] U.S. Cl................................................. 219/69 E,
219/69 G, 219/125 PL, 318/20.155
[51] Int. Cl..................................................... B23k 9/16,
B23k 9/12
[50] Field of Search.......................................... 219/125
PL, 69 E, 69 V, 69 G, 69 D; 318/20.150, 20.155;
250/202

[56] References Cited
UNITED STATES PATENTS

| | | | |
|---|---|---|---|
| 3,122,628 | 2/1964 | Inoue............................ | 219/69 V |
| 3,335,287 | 8/1967 | Hargens....................... | 250/202 |
| 3,435,177 | 3/1969 | Shaffer......................... | 219/69 G |
| 3,493,762 | 2/1970 | Dulebohn..................... | 318/20.155 X |
| 3,502,882 | 3/1970 | Von Voros................... | 219/125 PL |

Primary Examiner—J. V. Truhe
Assistant Examiner—Hugh D. Jaeger
Attorney—Thomas G. Devine

ABSTRACT: Apparatus effecting machining of a workpiece by electrically induced erosion, through electric discharge machining or electrochemical machining, the machining following an irregular configuration identical to the shape of a drawing optically sensed and followed.

INVENTOR.
DAVID H. DULEBOHN

FIG. 9
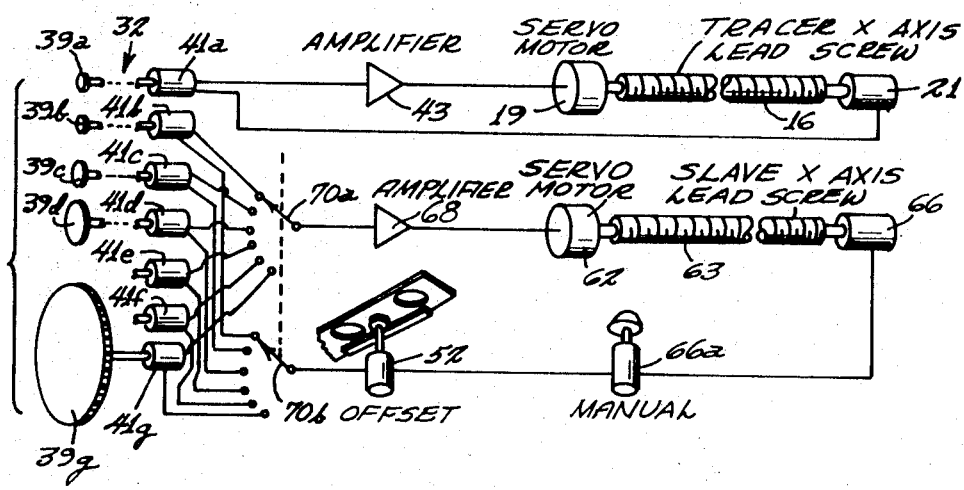
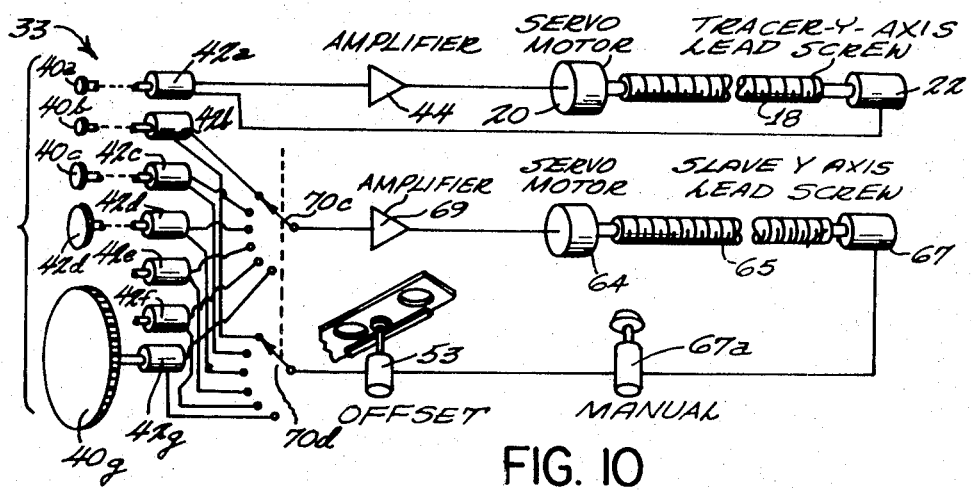
FIG. 10

TRACER CONTROLLED MACHINING BY ELECTRICALLY INDUCED EROSION

CROSS-REFERENCE TO RELATED APPLICATION

This is a continuation-in-part of application Ser. No. 784,453, filed Dec. 17, 1968, and now abandoned.

BRIEF SUMMARY OF THE INVENTION

According to the present invention a line following tracer, sensing a line of a drawing, controls the direction of electrically induced machining of a workpiece; the machining being effected by either electric discharge machining or electrochemical machining; and the rate of movement of the tracer head along the drawing is controlled by the rate of erosion of the workpiece and the length of gap between the electrode and workpiece. The desired length of gap and shape of the course being followed in machining the workpiece is thereby carefully controlled. Rough cutting and finish cutting may be accomplished from the same line of the drawing.

BRIEF DESCRIPTION OF THE DRAWINGS

FIG. 9 is a diagrammatic sketch illustrating the control and operating mechanisms of the X-axis lead screws in the tracer and slave machine.

FIG. 10 is a diagrammatic control and operating apparatus of the Y-axis lead screws in the tracer and in the slave machine.

The tracer is indicated in general by numeral 10, and the slave machine is indicated in general by numeral 11. Principal aspects of the tracer 10 are described and illustrated herein and other details have been omitted.

TRACER

Figure 1:
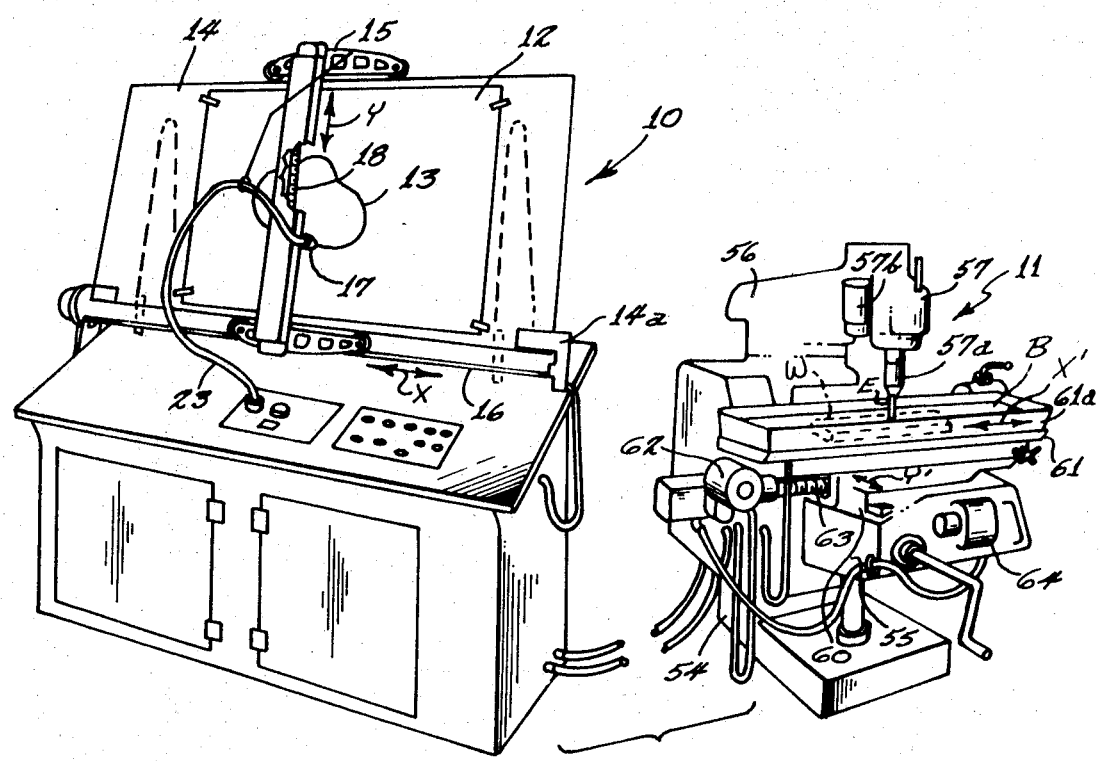
FIG. 1 is a perspective view of the tracer and of the machine controlled thereby for effecting the electrically induced machining.

As shown in FIG. 1, the tracer 10 carries a drawing 12 on which a line 13 appears. The drawing 12 is laid flat, or in a plane, and is attached as by tape to a flat, rigid panel 14 constructed of smooth light-transmitting material such as glass. The upper and lower edges of the panel 14 are straight and parallel, and mount and guide the mounting wheels of a carriage 15 movably in the X-axis direction indicated by arrows X and under influence of the X-axis lead screw 16, which is journaled at its opposite ends in bearings attached to the panel 14. The carriage 15 has a follower or nut on the lead screw 16 to effect linear movement of the carriage as the lead screw 16 is revolved. The upright panel 14 is supported from the base by rigid brackets 14a.

The carriage 15 carries a line following head 17 slidably mounted in the Y-axis direction as indicated by the arrows Y and under the influence of the Y-axis lead screw 18, the opposite ends of which are journaled in bearings on the carriage 15 adjacent the upper and lower edges of the panel 14. As illustrated in FIGS. 9 and 10, the X-axis and Y-axis lead screws 16 and 18 respectively, are operated by servomotors 19 and 20 respectively, and the lead screws 16 and 18 are also driveably connected to the rotors of synchro control transmitters 21 and 22, which are commonly referred to as simply synchros.

Referring back to FIG. 1, the line following head 17 transmits an image of a small segment of the line 13 under a high degree of illumination through a coherent fiber optics bundle 23 and directs the image into the rotary image sensing head 24 (see FIG. 7) in the tracer. The image I as indicated in FIG. 8 is cast into the rotary head wherein an image divider 25 has a knife edge 25a on the rotation axis R of the head 24, and the image is directed to the reflecting surfaces 25b so that the segment 13' of the line in the image I is reflected to the photocells 26 and 27 which are alternately operable, depending upon the direction of travel of the head 17 along the line. The photocells 26 and 27 are divided so that when the segment 13' of the line moves to one side or the other, the halves of the divided photocell will unbalance a bridge circuit and cause the reversible motor 28 (see FIG. 7) to revolve in one direction or another and thereby turn the head 24 through the timing belt 28a and return the photocell into balanced condition with respect to segment 13' in the image. The turning of the head 24 to a new orientation adjusts the rotation speeds of the X-axis and Y-axis lead screws 16 and 18 to enable the head 17 to follow the line in the changed direction as hereinafter pointed out in detail.

Figure 2:
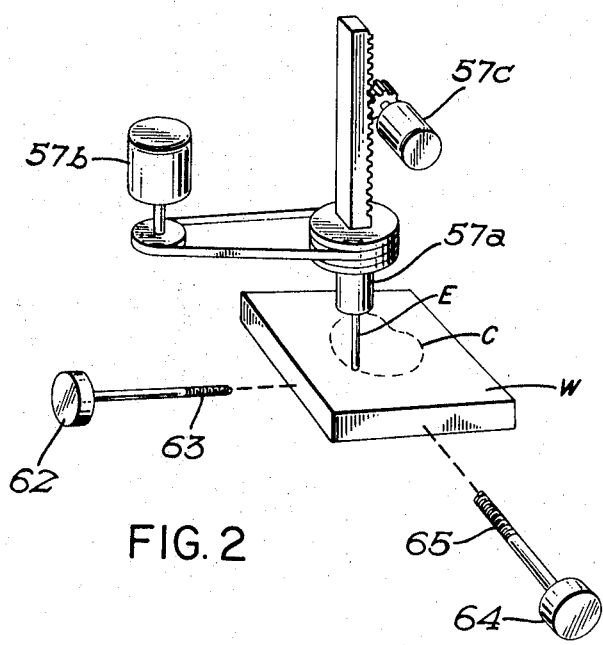
FIG. 2 is a diagrammatic sketch of the principal elements of the apparatus effecting the electrically induced machining and the control thereof.
Figure 3A:
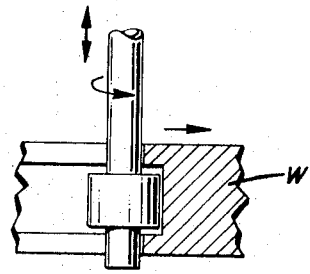
FIGS. 3A and 3B are diagrammatic sketches illustrating modified forms of electrodes especially applicable in electrochemical machining.
Figure 3B:
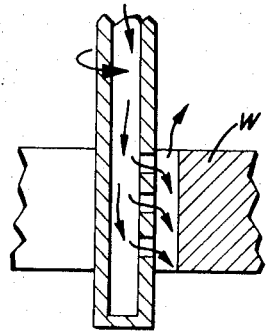
Figure 3:
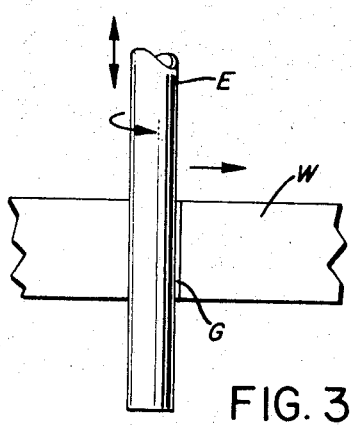
FIG. 3 is an enlarged diagrammatic sketch illustrating the relationship between the electrode and workpiece during machining.
Figure 4:
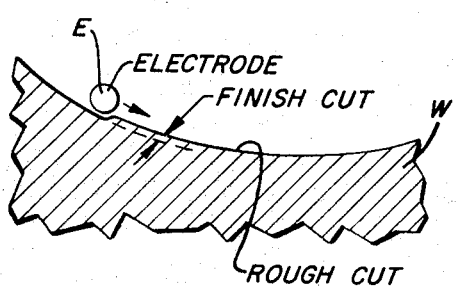
FIG. 4 is a diagrammatic sketch illustrating the machining during the production of a finish cut.

The orientation of head 24 also controls the direction of relative movement between the workpiece W and the electrode E (see FIGS. 2–4). The rate of relative movement between the workpiece W and the electrode E controls the length of the gap G, as hereinafter more fully described.

Figure 5:
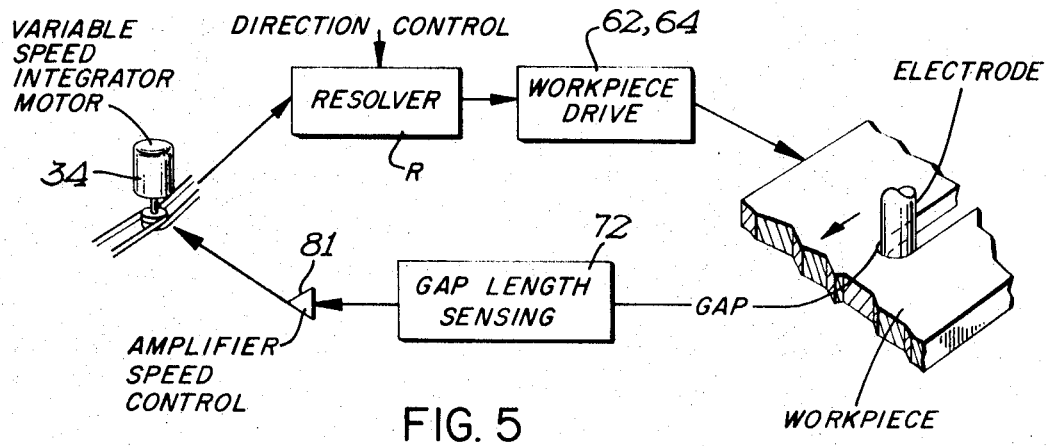
FIG. 5 is a block diagram and sketch illustrating the principal components of the present invention.

As shown in the block diagram of FIG. 5, the tracer incorporates a resolver, indicated in general by letter R, which responds to the direction indication provided by head 24, shown as input "Direction Control" and a speed indication derived from the length of the gap G, as hereinafter more fully described to control the rate of turning of the X-axis and Y-axis lead screws in the tracer 10 and the slave machine 11.

Figure 7:
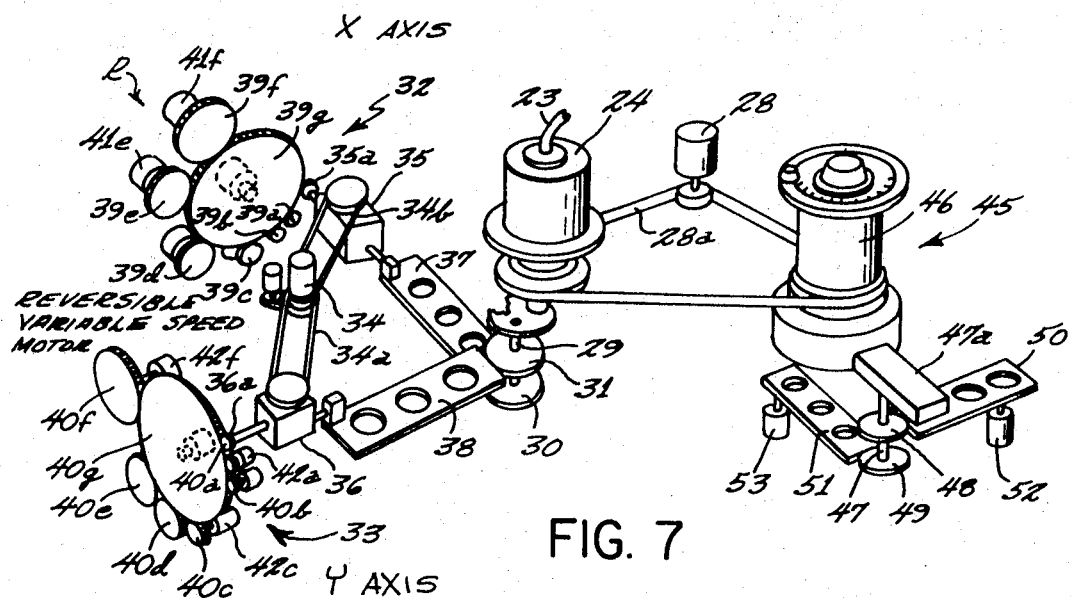
FIG. 7 is a diagrammatic sketch illustrating the principal components of the tracer.
Figure 8:
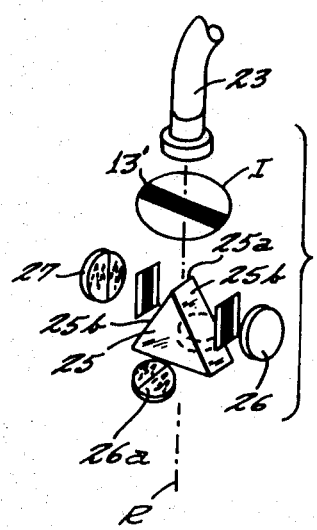
FIG. 8 is an enlarged diagrammatic sketch of certain principal components in the tracer in their operating relationship to each other.

Referring to FIG. 7, the resolver R receives the direction indications from the head 24, through an eccentric 29 which carries circular disks 30 and 31.

The resolver R includes X-axis and Y-axis control mechanisms 32 and 33 respectively of the tracer. Resolver R is described in detail below by way of describing mechanisms 32 and 33. A substantially continuously operating, variable speed motor 34 is operated at a rate related to the length of gap G being maintained and the rate of erosion of the workpiece W, and the motor 34 provides the input for both the X-axis and Y-axis control mechanisms of the tracer. The motor 34 is connected by timing belts 34a and 34b to the ball disk integrators 35 and 36 so that the input to both integrators is the same. The outputs of the ball disk integrator are at rotary gears 35a and 36a, the speed and direction of rotation of which relate directly to the linear positions of the slides 37 and 38 respectively which bear against the disks 30 and 31. Thus, as the head 24 changes its orientation under influence of motor 28, the rotation speed and/or direction of rotation of output gears 35a and 36a are changed.

In the X-axis control apparatus 32, gear 39a is meshed with the drives into a train of gears 39a–39g. Gears 39a and 39b are identical in size, and the remainder of the gears in the train are of various sizes to produce various speed ratios. The speed ratio between gears 39a and 39g, the smallest and the largest, is 10 to one as illustrated. Of course, other ratios such as 20 to one might be used.

Similarly, the Y-axis control apparatus 33 includes a train of gears 40a–40g wherein gears 40a and 40b are identical in size. The size of the remaining gears in the train varies to obtain speed ratios identical to the speed ratios in the other gear train.

The several gears 39a–39g are drivably connected on the rotors of synchro transformers 41a–41g, and similarly, the gears 40a–40g, are drivably connected to the rotors of synchro transformers 42a–42g.

As indicated in FIGS. 9 and 10, the synchro 41a is connected through an amplifier 43 to servomotor 19 of the X-axis tracer lead screw, the turning of which is sensed by synchro 21, providing feedback to the synchro 41a; and, similarly, the synchro 42a is connected through amplifier 44 to the servomotor 20 of the Y-axis tracer lead screw 18, the turning of which is sensed by synchro 22 to provide feedback to the synchro 42a. Simply by turning gears 39a and 40a by the output of integrators 35 and 36, the rotors of synchros 41a and 42a are revolved to create and unbalance in their respective servo loops to cause servomotors 19 and 20 to revolve the lead screws.

The remainder of the synchros 41b–41g and 42b–42g provide for moving the workpiece W in the slave machine 11 as hereinafter more fully described.

OFFSET CONTROL

The tracer 10 also incorporates and offset control apparatus 45 including a rotor 46 turned under the influence of timing belt 28a and motor 28 simultaneously with the rotary head 24 for maintaining the adjustable eccentric 47 at a predetermined angular orientation with respect to the axes of rotors 24 and 46 and thus in relation to the outputs of the X-axis and Y-axis control mechanisms 32 and 33. THe eccentric 47 is mounted on a slide 47a which is adjustable across a diameter of rotor 46, and, of course, when the eccentric 47 is on the rotation of rotor 46, there is no eccentric movement.

The eccentric 47 has circular operating disks 48 and 49 to move slides 50 and 51 respectively and cause turning through rack and pinion drives of synchro differential transmitters 52 and 53 respectively. The synchros 52 and 53 turn to add motion to the slave machine only so as to keep the electrode in the slave machine off to one side of the line of trace as for making large or small adjustments in the size of the part being cut, and for producing a finish cut somewhat as illustrated in FIG. 4.

SLAVE MACHINE

The slave machine 11 has a base and column structure 54 on which the saddle mounting knee 55 is vertically adjustable. The ram and turret assembly 56 carries the spindle head assembly 57 which includes the drive motor 57b for turning the spindle 57a which mounts the electrode E. The electrode may be of any of a plurality of different sizes or configurations, but in most instances will be rod shaped, and may be tubular in some instances to permit oil or electrolyte to be pumped therethrough.

The saddle 60 is slidable on the knee 55 in a fore-and-aft direction indicated by the arrow Y'. The workpiece mounting table 61 is mounted on the saddle 60 for side-to-side movement in the direction of arrows X'. The workpiece mounting table incorporates a receptacle 61a for the bath B in which the workpiece W is immersed.

Movement of the table 61 in the X-axis direction is produced by a servomotor 62 which rotates the X-axis lead screw 63 on the workpiece mounting table, see also FIG. 9. Movement of the saddle 60 is produced by the servomotor 64 which revolves the Y-axis lead screw 65 which is journaled on the knee 55 and cooperates with a lead screw nut on the saddle. The saddle also carries another lead screw nut cooperating with the X-axis lead screw 63. Turning of the X-axis and Y-axis lead screws is controlled by turning the rotors of synchros 66 and 67 respectively.

The spindle 57a may be moved downwardly to move the electrode into the workpiece under influence of motor 57c in the spindle head assembly. The motor 57c may also be operated to slowly vertically oscillate the electrode E in the workpiece during an electric discharge or electrochemical machining operation.

As seen in FIGS. 9 and 10 the servomotors 62 and 64 are connected through amplifiers 68 and 69 respectively and through ganged switches 70a and 70c to a selected one of the corresponding synchros 41b–41g and 42b–42g respectively. These same synchros are also connected through ganged switches 70b and 70d to the feedback synchros 66 and 67, the rotors of which are connected to the lead screws. These servo loops which include the lead screws 63 and 65 also include the manually operable synchros 66a and 67a respectively and the offset control synchros 52 and 53.

WORKPIECE CUTTING

The cutting of the workpiece is to be effected by electrically induced erosion. The cutting by erosion may be accomplished in either to two ways, with electric discharge machining, which depends upon sparking across the gap between electrode and workpiece by applying a pulsating DC voltage to the electrode and workpiece and utilizing a spark-quenching oil to flush to minute globules of metal from the gap; or, alternatively, with electrochemical machining wherein the electrode and workpiece are respectively charged negatively and positively by low-voltage DC power supply providing high amperage flowing through the gap, through which an electrolyte is moved to produce an electrochemical reaction on the workpiece and thereby effecting the erosion. In the electrochemical machining, the electrotype is ordinarily salt water and the electrode is ordinarily brass; and in the electric discharge machining, the electrode is preferrably tungsten or copper-tungsten, brass, carbon, or some other similar electrode material which is well known in the art.

The cutting of the workpiece by erosion in both the electrochemical machining and electric discharge machining depends upon the maintenance of a gap of proper size, and, as the gap changes in size, the current through the gap and the voltage across the gap will change considerably. In accordance with the present invention, the relative motion between the workpiece and the electrode is equated with the rate of erosion. In other words, the rate of advance of the electrode caused by the operation of motor 34 depends upon the size of the gap which is measured.

GAP LENGTH SENSING

Figure 6:
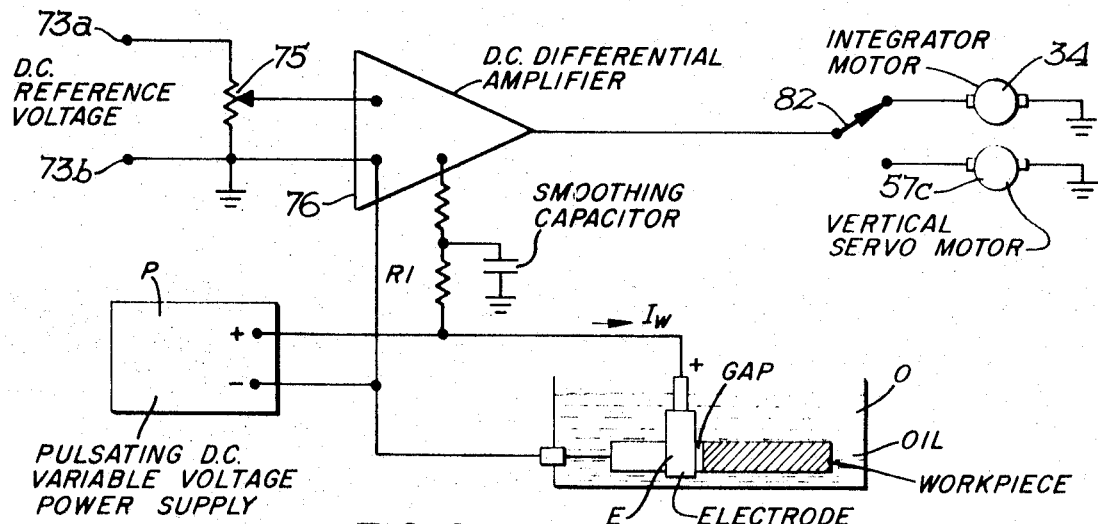
FIG. 6 is a schematic diagram of important aspects of the control circuit for the electric discharge machining.

With reference of FIG. 6, which pertains to electric discharge machining, it will be noted that the electrode E and the workpiece W are connected to a power supply P supplying a pulsating DC current and wherein the voltage of the supply is variable. Such power supplies are well known and the details of it are not significant for purposes of the present invention.

The current $I_w$ flows through the gap on an intermittent basis, starting abruptly each time the voltage at P+ overcomes the dielectric resistance of the oil O in the gap. With any fixed open circuit voltage setting at P+, high-current flow $I_w$ is associated with a small gap which causes reduced closed circuit voltage at P+. Low-current flow is associated with a larger gap and higher closed circuit voltage at P+. The small current flow into the differential amplifier through resistors R1 and R2 is a function of the P+ voltage, and the P+ voltage is a function of the size of the gap. A small current flow through R1 into smoothing capacitor C1 establishes a smooth, positive voltage input into the differential amplifier 76. This voltage, smoothed by capacitor C1, is a function of the gap voltage and consequently the gap size. The differential amplifier 76 compares this voltage to the voltage which is established at terminals 73a, 73b from the DC reference voltage by potentiometer 75. If these two voltages are in the proper relation to each other, the system is in balance and the gap remains fixed while erosion continues. When the gap is increased by erosion, the differential amplifier 76 senses the increased voltage at P+ and powers the integrator motor to advance the electrode a minute amount, thus reducing the gap and reestablishing the system balance.

Thus the potentiometer 75 is able to control the gap size; a higher voltage at 75 will increase the gap and reduce the erosion rate.

A switch 82 is provided for directing the output from the amplifier into the downfeed motor 57c, when it is desired to initially move the electrode E downwardly through the workpiece.

Figure 6A:
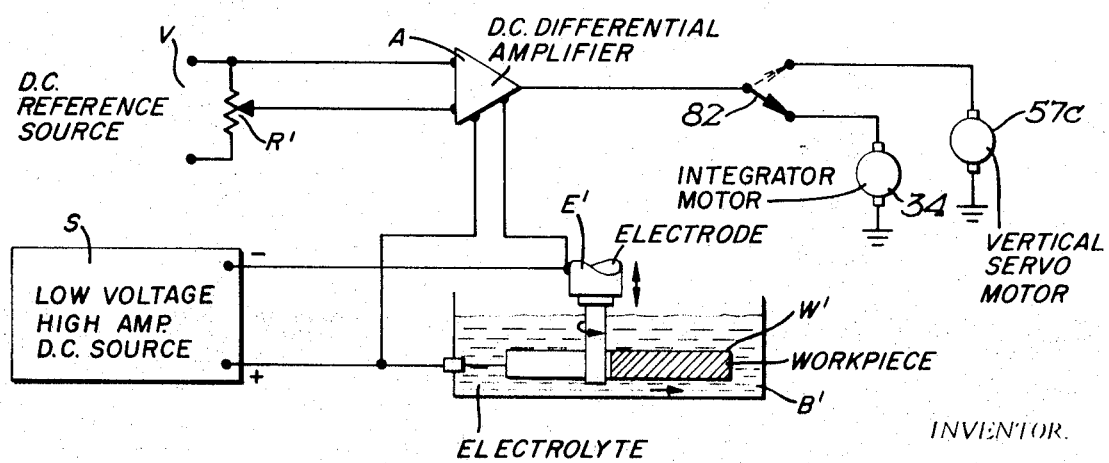
FIG. 6A is a schematic diagram of important aspects of the control circuit for the electrochemical machining.

With reference to FIG. 6A, which pertains to electrochemical machining, the electrode E' and workpiece W' in the electrolyte bath B' are respectively connected to the negative and positive sides of the low-voltage high-amperage DC source S. The voltage, at the output of the source will vary slightly in response to a change in the gap current as a result of the change in the size of the gap, and this change in the voltage is detected by a DC differential amplifier A, into which an accurately regulated DC reference voltage is also applied from the potentiometer R' which is supplied with a DC reference voltage from a suitable regulated source. The differential amplifier A compares the reference voltage to the gap voltage. The output from the differential amplifier A is applied to the resolver motor 34 so that the motion induced by the motor 34 is in direct relation to the size of the gap which has been sensed to maintain the gap at a certain size. If the gap is too large, the gap voltage will exceed the reference voltage and the motor will move the electrode closer to the workpiece and thereby decrease the gap. Conversely, if the gap is too small, the reference voltage will exceed the gap voltage and the motor will stop or reverse the electrode motion and thus increase the gap. Normally, the electrode advances in extremely small increments so that the gap is maintained at a voltage set by potentiometer R'. The operator can vary the size of the gap (and consequently the cutting rate) by means of potentiometer R'. The output from the amplifier A is alternately applicable to the downfeed vertical servomotor 57c to induce downward movement of the electrode through the workpiece as the initail cut is being effected, this initial cut being made to introduce the electrode into the workpiece.

OPERATION

The normal operation of the tracer 10 and slave 11 is substantially the same regardless of whether electrochemical or electric discharge machining is employed. The workpiece is immersed in the oil or electrolyte bath, and with the electrode aligned in a starting position relative to the workpiece, and the switch 82 may be turned to the alternate position so as to connect the downfeed motor with the amplifier, whereby the electrode is moved downwardly toward the workpiece so as to produce the gap at the end of the electrode and effect the production of a hole in the workpiece to accommodate the electrode. The use of a tubular electrode for producing a hole in the workpiece may be desirable in order to permit pumping of the oil or electrolyte downwardly through the electrode and through the gap.

As the electrode is then prepared for movement along a course C (FIG. 2) substantially identically to configuration of the drawing 13, the switch 82 will then be operated to connect the resolver motor 34 to the output from the gap length sensing circuit. The potentiometer will be adjusted to control the speed of the motor 34 and consequently workpiece erosion rate. If the potentiometer 74 or R' is adjusted to increase the output to motor 34, the gap current is increased to produce a substantial rate of erosion because the length of the gap is maintained rather small.

The operation of motor 34 produces operation of the resolver systems so as to produce operation of the X-axis and Y-axis lead screws at a net rate corresponding to the speed of motor 34. The head 24 is oriented by the line-following photocells to correspond to the direction of the line 13 in the drawing so as to set the relative output rotational speeds of the ball disk integrators 35 and 36, which produces rotation of the lead screws.

In order to minimize errors and gain accuracy, it is desirable that the configuration defined by the line 13 be as large as possible, and it is desirable that the maximum reduction ratio be utilized as between the size of the configuration defined by the drawing 13, and the actual size of the trace or course C to be effected at the workpiece W. In the illustrated position of the ganged switches 70a–70c, the lead screws 63, 65 will actually turn at the same rate as the lead screws 16, 18, but it can easily be understood that by changing the ganged switch to a different position, and therefore to a different reduction ratio between the tracer and the slave, the rate of turning of lead screws 63, 65 may be reduced substantially as compared to the tracer lead screws 16, 18. This reduction enables use of a drawing, greatly enlarged, relative to the work.

When the workpiece W is in motion, the gap length sensing circuit is constantly monitoring or sensing the voltage across the gap, which is directly related to the length of the gap, and is constantly comparing gap voltage to the reference voltage, to thereby change the speed of rotation of the motor 34 so as to speed up or slow down the overall operation of the tracer and slave machine X-axis and Y-axis lead screws in the proper proportion. If the electrochemical machining is being used, any variation in gap voltage is detected and the output from the differential amplifier A produces appropriate operation of motor 34.

In a finishing operation the cut along the workpiece is produced with a lesser amperage so that the surface produced is considerably smoother. The electrode may be adjusted closer to the work by the offset control mechanism 45 wherein the eccentric 47 is moved from its previous setting so that the finish cut, substantially as illustrated in FIG. 4, will be produced. It should be understood that the offset produced by adjusting the eccentric 47 facilitates the production, in the workpiece W of an edge which is identical to the configuration of the line 13 of the drawing, in contrast to making the center of the cut identical to the shape of the line 13. Compensation is thereby made for the diameter of the electrode.

During the normal operation of the electrode in eroding the workpiece, the electrode may be continuously revolved under operation of the spindle rotating motor 57b so that the rotation of the electrode carries fluid from the bath through the gap so as to continuously clear the eroded material from the gap area. In electrochemical machining, spinning the electrode carries fresh electrolyte into the gap as is necessary. Additionally, it is found that, in most situations, it is desirable to vertically oscillate the electrode as by operating the downfeed motor 57c at a rate such that the direction of vertical travel of the electrode changes once every few seconds, in the case of electric discharge machining. The vertical oscillation exposes more of the electrode to the work and greatly reduces the dimensional changes resulting from electrode erosion.

The vertical oscillation of the electrode used in the electrochemical machining will produce movement of the electrolyte into and through the gap G as is required. In order to supply fresh electrolyte into the gap area and carry the eroded material.

The electrochemical machining is particularly effective for producing various reliefs and undercuts, one form of which is illustrated in FIG. 3A wherein the workpiece W is being undercut by an electrode which is spinning and oscillating slightly as it moves forwardly into the workpiece. In FIG. 3B, the electrode is shown with a hollow center and a number of apertures facilitating movement of the electrolyte downwardly through the electrode and then into the gap area. The electrode in this case may also be subjected to spinning to additionally flush the gap area with a fresh electrode.

Figure 3C:
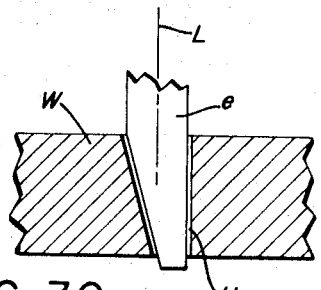
FIGS. 3C and 3D are elevation and section views of an electrode forming an unsymmetrical cut in electrochemical machining of a workpiece.
Figure 3D:
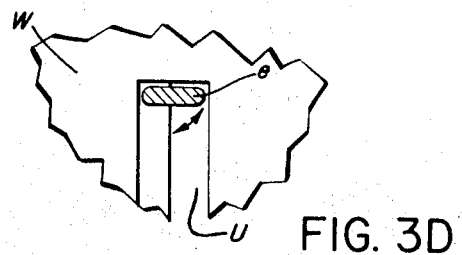

In FIGS. 3C and 3D, the electrode e is being used to produce an unsymmetrical cut U in the workpiece W. In this electrochemical machining operation, the electrode e will be oscillated slightly about its vertical axis L so as to produce continuous flushing of the gap area as the electrode is moved toward the workpiece.

It will be seen that I have provided tracer controlled operation of slave machine wherein machining of the workpiece is being accomplished by electrically induced erosion, either by electric discharge machining or electrochemical machining, and wherein both rate and direction of relative travel between the electrode and workpiece are controlled so that the configuration produced is identical to the shape of the drawing in the tracer, and the cutting or erosion proceeds at a rate commensurate with the nature of finish desired and the nature of material being worked upon so as to permit the inexpensive production of such workpiece of most any shape or design.

What I claim is:

1. Apparatus for machining a workpiece by electrically induced erosion having sensing means for producing indications of the size of the gap between the electrode and the workpiece and having means for producing relative movement between the electrode and the workpiece comprising, a source of directional indications of the angular direction which relative movement is to be produced between the electrode and workpiece, driving means producing relative movement between the electrode and workpiece in multiple fore and aft and transverse directions, and a resolver responsive to said gap size indications and to said directional indications and effecting operation of said driving means in the indicated angular direction to produce machining of the workpiece in the desired direction and said resolver also effecting operation of said driving means at a rate commensurate with maintaining a gap of predetermined size.

2. The invention according to claim 1 and said resolver including a variable speed device responding to the gap size indications, the speed of said device controlling the rate at which said driving means is operated.

3. The invention according to claim 2 wherein said device is reversible in response to certain gap size indications when the gap is excessively small whereby to open the gap to the desired predetermined size.

4. The invention according to claim 2 wherein said device comprises an electric motor, controllable is speed and direction is response to input current related to the size of the gap.

5. The invention according to claim 1 and the driving means including X-axis and Y-axis linear translation mechanisms producing relative movement between the electrode and workpiece in transverse lineal directions, said X-axis and Y-axis translation mechanisms changing speeds and directions relative to each other under influence of said resolver and in response to said gap size indications and directional indications to produce relative movement between the electrode and workpiece in a desired direction while maintaining the gap at a predetermined size.

6. The invention according to claim 1 and said source of directional indications including a tracer with a head following the contour of the line of a drawing carried by the tracer, the directional indications corresponding to the direction of the line at the head, whereby relative movement between the electrode and workpiece proceeds in the angular direction of said indications and results in cutting of the workpiece progressively in direction corresponding to the contour of the line of the drawing.

7. The invention according to claim 6 and the tracer also having driving means producing relative movement between the head and the drawing in multiple fore and aft and transverse directions, said resolver also controlling the tracer driving means in response to said gap size indications and directional indications to produce relative movement between the tracer head and the drawing corresponding to the relative movement between the electrode and workpiece.

8. The invention according to claim 7 and said resolver also being reversible to reverse the direction of the tracer driving means and also of the driving means for the electrode and workpiece, the relative movement between the electrode and workpiece being in a reverse direction and along the contour of the cutting of the workpiece.

9. The invention according to claim 1 and including a motor continuously rotating the electrode for carrying the fresh bath liquid through the gap for flushing the material removed from the workpiece.

10. Workpiece machining apparatus comprising eroding means including an electric power supply and an electrode for effecting machining of the workpiece by electrically induced erosion resulting from electric current traversing the gap between the electrode and workpiece, said means mounting the electrode and workpiece for relative movement in multiple directions as the workpiece is eroded, sensing means producing indications of the size of the gap, a source of directional indications of the angular direction in which relative movement is to be produced between the electrode and workpiece, driving means producing relative movement between the electrode and the workpiece in multiple fore and aft and transverse directions, and a resolver responsive to said gap size indications and to said directional indications and effecting operation of said driving means in the indicated angular direction to produce machining of the workpiece in the desired direction and said resolver also effecting operation of said driving means at a rate commensurate with maintaining a gap of predetermined size.

11. The invention according to claim 10 and said eroding means effecting electric discharge machining of the workpiece and moving spark-quenching oil through the gap to flush eroded material therefrom, and said power supply providing pulsed DC voltage across the gap and resulting in current sparking across the gap for eroding the workpiece.

12. The invention according to claim 10 and said eroding means effecting electrochemical machining of the workpiece and moving electrolyte through the gap to carry high-amperage DC current and erode the workpiece.

13. The apparatus according to claim 10 and said resolver also being reversible to reverse the direction of the drive means and thereby increase the spark gap, the reversing of the resolver being in response to gap size indications denoting an undesirably small gap between the electrode and workpiece.

PO-1050
(5/69)

UNITED STATES PATENT OFFICE
CERTIFICATE OF CORRECTION

Patent No. 3,614,372  Dated October 19, 1971

Inventor(s) David H. Dulebohn

It is certified that error appears in the above-identified patent and that said Letters Patent are hereby corrected as shown below:

Column 1, line 19, "of" should be --on--.
Column 2, line 64, delete "the" (second occurrence).
Column 2, line 70, "the" should be --and--.
Column 3, line 28, "and" should be --an--.
Column 3, line 34, "THe" should be --the--.
Column 3, line 37, after "rotation" insert --axis--.
Column 4, line 22, "to" should be --of--.
Column 4, line 37, "electrotype" should be --electrolyte--.

Column 7, line 21, after the last word "direction" insert --in--.
Column 7, line 44, "is" should be --in--.
Column 7, line 45, "is" should be --in--.
Column 8, line 4, "direction" should be --directions--.

Signed and sealed this 9th day of May 1972.

(SEAL)
Attest:

EDWARD M.FLETCHER,JR.
Attesting Officer

ROBERT GOTTSCHALK
Commissioner of Patents